United States Patent
Leppanen (12)

(10) Patent No.: US 6,257,172 B1
(45) Date of Patent: Jul. 10, 2001

(54) POWDER-DISPENSING ANIMAL GROOMING BRUSH

(76) Inventor: Carl F. Leppanen, 72 Ellie Dr., Santa Rosa, CA (US) 95403

( * ) Notice: Subject to any disclaimer, the term of this patent is extended or adjusted under 35 U.S.C. 154(b) by 0 days.

(21) Appl. No.: 09/273,042

(22) Filed: Mar. 19, 1999

(51) Int. Cl.$^7$ .................................................. A01K 13/00
(52) U.S. Cl. .......................................... 119/605; 119/664
(58) Field of Search ..................................... 119/605, 602, 119/612, 664, 613, 652, 659, 662

(56) References Cited

U.S. PATENT DOCUMENTS

| | | |
|---|---|---|
| 866,523 | 9/1907 | Schneider . |
| 987,433 | 3/1911 | Crawford . |
| 2,565,889 | 8/1951 | Schroer . |
| 3,995,597 | 12/1976 | Warwick ............................ 119/605 |
| 5,101,532 | 4/1992 | Dyson et al. ...................... 15/320 |
| 5,365,880 | 11/1994 | South ................................. 119/602 |

*Primary Examiner*—Peter M. Poon
*Assistant Examiner*—Yvonne R. Abbott
(74) *Attorney, Agent, or Firm*—Johnson & Stainbrook; Larry D. Johnson; Craig M. Stainbrook

(57) ABSTRACT

A grooming brush adapted to dispense medicinal or pesticidal powder into the hair or fur of an animal through the action of brushing alone, having a handle and a head, the head having a top, a bottom, and four sides, the fourth of which is integral with the handle. The head is divided into a first and second chamber for storing and dispensing powder, the chambers defined by two partitioning walls. The bottom of the head has a plurality of bristles, an elongate opening which runs the length of the head, and a rotatable cylinder set into the elongate opening, the cylinder having a plurality of shallow depressions and a cog wheel with an circumferential border at approximately the tip of the bristles. When in use, the cog wheel engages the hair of the animal and the cylinder rotates alternatingly within the powder reservoirs and without, thus alternately collecting powder from the reservoirs and depositing it onto the animal.

5 Claims, 3 Drawing Sheets

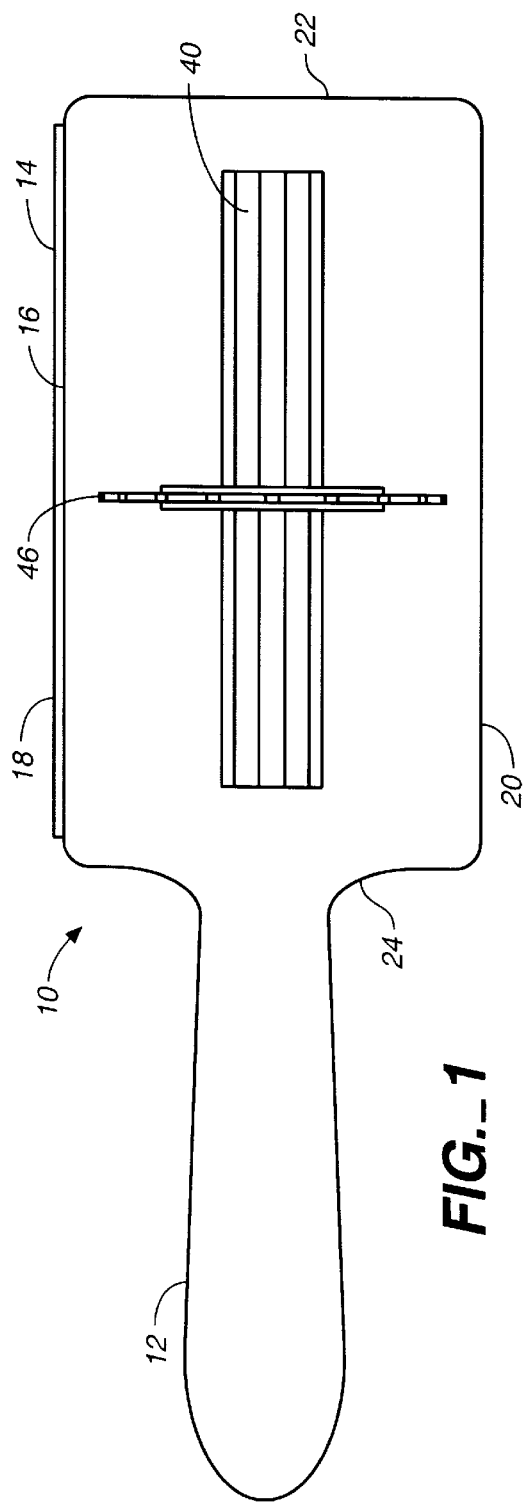
FIG._1
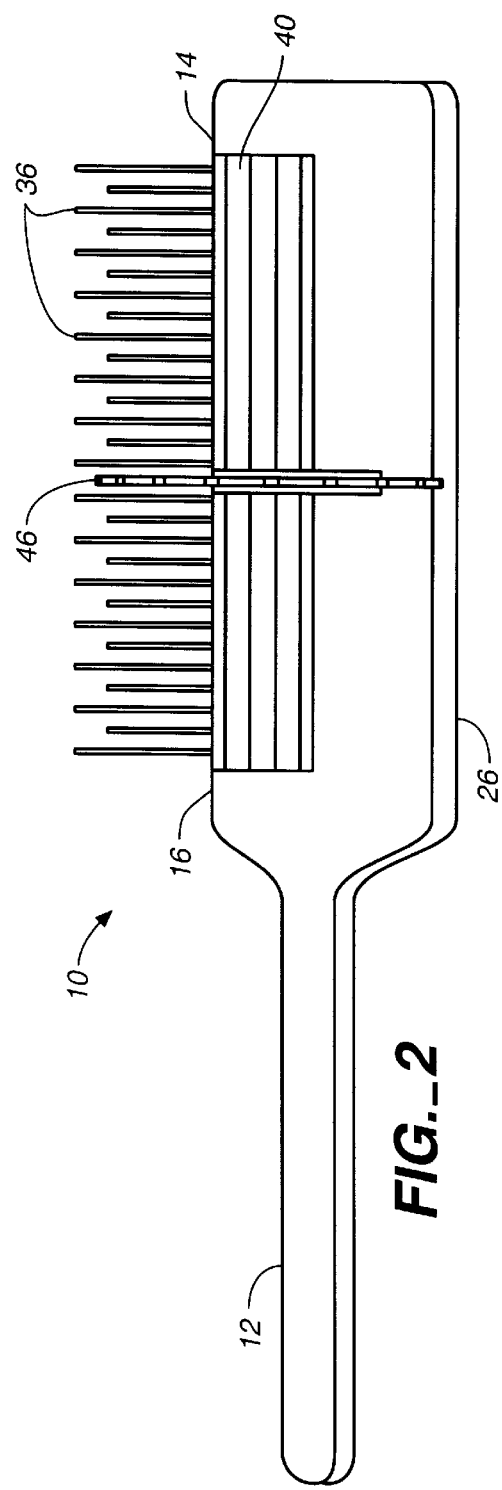
FIG._2

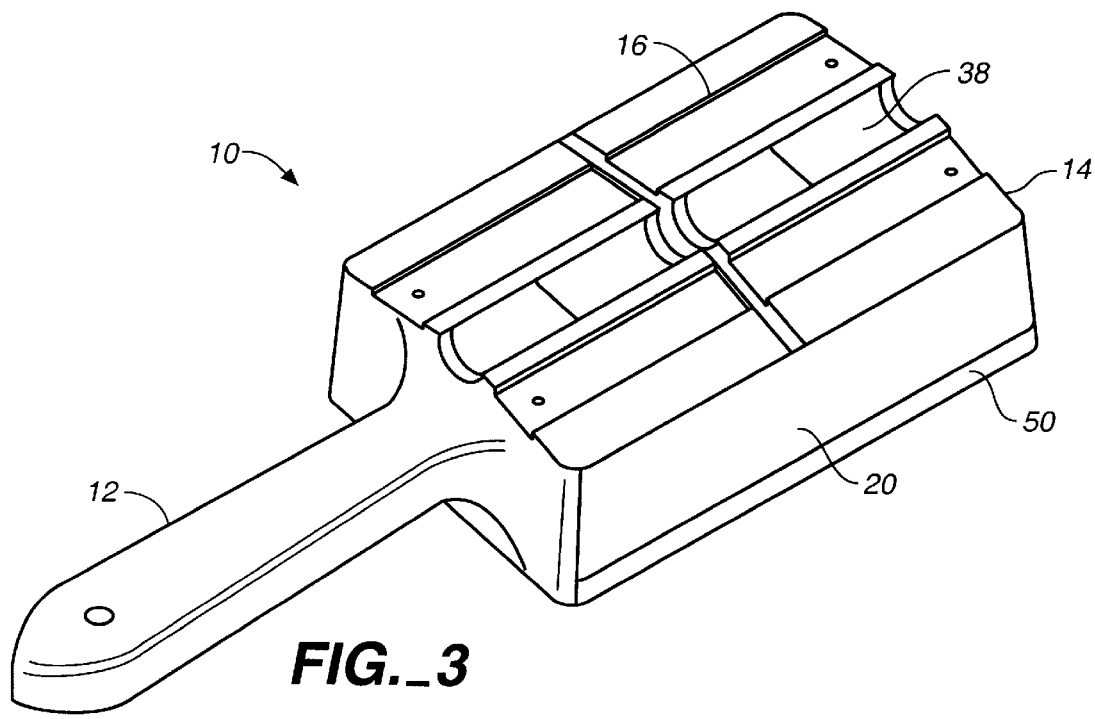
FIG._3
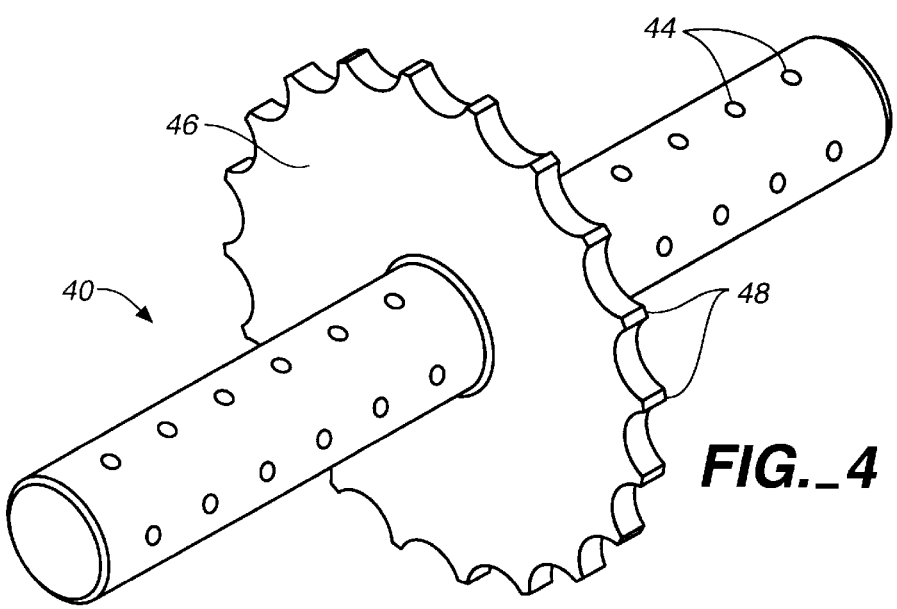
FIG._4

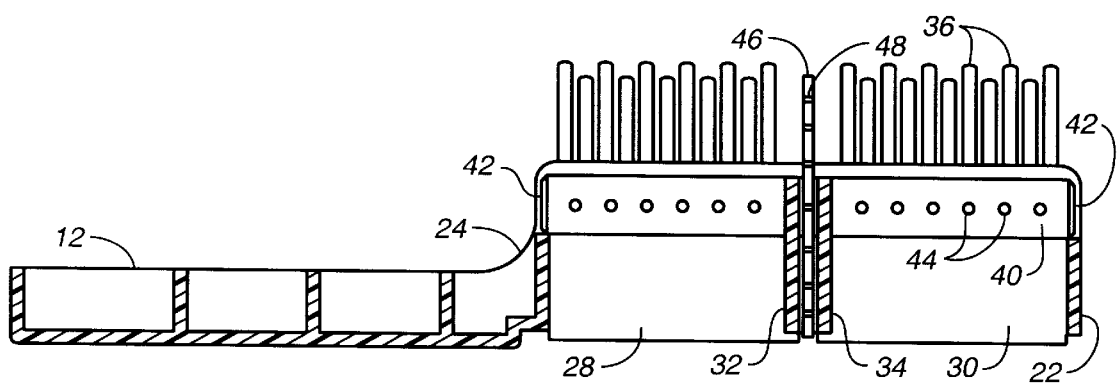
FIG._5
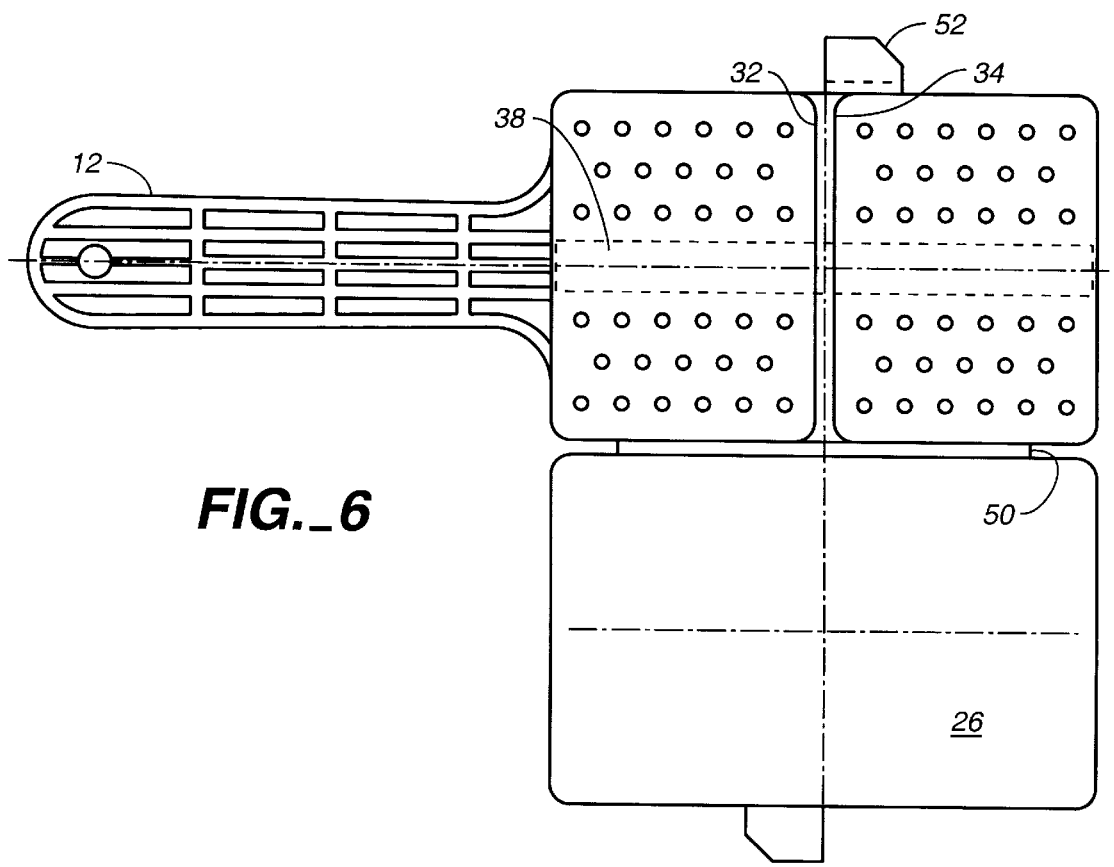
FIG._6

POWDER-DISPENSING ANIMAL GROOMING BRUSH

BACKGROUND OF THE INVENTION

1. Field of the Invention

The present invention relates generally to powder dispensing brushes, and more particularly to a brush for applying pesticidal or medicinal powder onto the skin of an animal covered by hair.

2. Description of the Prior Art

Many devices known in the art are adapted to dispense pesticides such as flea powder into the fur or hair of a domestic animal during brushing or grooming. For example, U.S. Pat. No. 4,044,724, Merchill, discloses a flat powder-dispensing brush with a body comprising first and second angularly related faces with an inlet at the second face and a passageway therefrom to the first face. The passageway may be connected to a flexible-walled container from which powder may be squeezed while brushing an animal.

U.S. Pat. No. 4,143,982, Cox, discloses a dispensing brush tray with an upraised rim and a bottom with discontinuous longitudinal slots and projecting bristles. Slidingly attached to the tray is a powder container having a bottom with cross slots alignable with the slots in the tray. By manually moving the container relative to the tray while brushing an animal, powder may be controllably dispensed.

A number of U.S. patents disclose powder dispensing brushes which employ hollow bristles or other kinds of projections with ports through which powder is dispensed, most notably including U.S. Pat. No. 4,213,423, Bryan; U.S. Pat. No. 4,902,154, Valenza; and U.S. Pat. No. 5,762,433, Cary. U.S. Pat. No. 4,944,625, Futter, discloses a powder dispensing brush of the pressure-feed type.

Finally, U.S. Pat. No. 5,365,880, South, discloses a grooming and dispensing brush with an inner tubular wall having a plurality of ports through the wall and an open-ended chamber which may be filled with powder and closed. An outer tubular wall surrounds the inner tubular wall, said outer tubular wall having a plurality of ports extending through the wall and bristles. The outer tubular wall has a tightening mechanism which allows it to be released and to rotate around the inner cylinder during brushing, thereby alternatively aligning ports in the inner and outer tubular walls so as to distribute powder. While dispensing powder, the bristles rotate along with the entire outer tubular wall.

Note that the term "bristle" is used herein in its generic meaning to cover not only what is known in the art to be denoted by "bristle", but other grooming projections such as claws, pins, pegs, posts, tines, teeth, and so forth.

The present invention allows the user to dispense medicinal or pesticidal powder onto the fur or hair of an animal and simultaneously to work the powder into the animal's skin simply by brushing. Unlike devices in the prior art, no act or movement other than brushing is needed either to dispense the powder or to control its flow. The rate of powder flow is controlled by the rapidity of brushing, and the amount of total powder dispensed is controlled by the duration of grooming.

SUMMARY OF THE INVENTION

The proper care of domestic animals often includes grooming and the application of medicinal and/or pesticidal powders. While animals typical enjoy grooming, particularly brushing and combing, many are frightened or annoyed by other kinds of care, however benign. Thus, owners face a significant challenge in calming a reluctant pet and successfully applying an effective amount of medicine or pesticide. Furthermore, application of powders independently of brushing is time consuming.

Accordingly, the present invention provides a grooming brush adapted to dispense medicinal or pesticidal powder into the hair or fur of an animal through the action of brushing alone. Additionally, the rate of powder flow and the total amount of powder dispensed is controlled exclusively by the rate of brushing and the total duration of grooming.

This is achieved by providing a brush which, in its preferred embodiment, has a handle and a head, the head being hollow and having a top, a bottom, and four sides, the fourth of which is integral with the handle. The head is divided into a first and second chamber, defined by two partitioning walls, physically separating the chambers from one another and forming a space between said walls. The chambers serve as reservoirs for medicinal or pesticidal powder.

The bottom of the brush head has a plurality of bristles, preferably composed of polyethylene. Bisecting the bottom is an elongate opening which runs the length of the head.

A hollow elongate cylinder is affixed at the first and third sides by pivot means so that the cylinder may rotate during use. The cylinder has a plurality of shallow circular depressions forming several rows along its length and fits snugly into the elongate opening on the bottom side of the head so as to prevent the discharge of powder other than through rotation of the cylinder caused by brushing motions. Affixed at the horizontal axis of the cylinder is fur engaging means, preferably a cog wheel having a plurality of scalloped teeth. The cog wheel has a radius roughly equal to that of the bristles so that when said brush is moved transversely along the hair or fur of an animal, the cog wheel is rotated and causes said cylinder to rotate. Powder held within one or both of the chambers collects in the depressions of the cylinder in the interior of the head and is thereafter deposited on the animal during brushing motions as the cylinder rotates.

BRIEF DESCRIPTION OF THE DRAWINGS

FIG. 1 is a top view of a first embodiment of the powder-dispensing animal grooming brush of the present invention.

FIG. 2 is a side elevation view of the first embodiment of FIG. 1 of the present invention.

FIG. 3 is a perspective view of the brush handle and head, with bristles and powder dispensing cylinder removed.

FIG. 4 is a perspective view of the powder dispensing cylindrical member and affixed cog wheel for actuating movement of said cylindrical member during brushing.

FIG. 5 is a side elevation cross-sectional view of a second embodiment of the powder dispensing brush showing the relative position of the powder dispensing cylindrical member within the brush head.

FIG. 6 is a top plan view showing the brush head with the top open and illustrating the two powder reservoirs.

DETAILED DESCRIPTION OF A PREFERRED EMBODIMENT

Directing attention to FIGS. 1–6, a brush 10 is shown, having a handle 12 and a head 14. A hollow elongate head is generally defined by a bottom 16, a first side 18, a second side 20, a third side 22, a fourth side 24 with which said handle 12 is integrally formed, and a top 26. The head is further composed of a first and second chamber, 28 and 30, respectively, defined by a first partitioning wall 32 and second partitioning wall 34, which physically divide the chambers from one another. The chambers function as reservoirs for medicinal or pesticidal powder.

The bottom 16 of said brush head 14 has a plurality of bristles 36, preferably composed of polyethylene, projecting downward from said head, and a elongate opening 38 bisecting and running substantially the entire length of the head, such that the elongate opening runs continuously and contiguously along the bottom side of each chamber.

A hollow cylinder 40 with cylindrical sides, and preferably integrally formed caps at each end, is rotatingly affixed to said first and third sides by pivot means, preferably integrally formed projections 42 from said first and third sides, 18 and 22, which may connect through a hole at the center of each end of said cylindrical member 40 and functioning as an axis about which said cylinder may rotate. When positioned thus, the cylinder 40 fits snugly into the elongate opening 38 on the bottom side of the head so as to prevent discharge of powder other than by rotation of the cylinder during grooming. Alternatively, sealing means may be provided to create a tight seal between the cylinder and the elongate opening of the head. Said cylinder has a plurality of shallow circular depressions forming several rows along its length. A cog wheel 46 having a plurality of scalloped teeth 48 is affixed to the cylindrical member at the horizontal axis and has a radius roughly equal to that of the bristles so that when said brush is run transversely along the hair or fur of an animal, the cog wheel is rotated and causes the cylinder to rotate.

The top 26 of the brush is attached to the head 14 by a living hinge 50 running continuously along the length of the second side 20 of the head. When the top is open, the first and second chambers 28 and 30 are exposed for filling with powder. The top may be closed and secured at the first side 18 of the head by connection means, preferably two integrally formed tabs which interaffliate to form a clasp 52 when the top is closed and prevent powder from spilling out.

To use the powder-dispensing animal grooming brush, only a few simple steps are required. Open the top 26 by unfastening the clasp 52. Pour the desired powder into either or both of the exposed and empty chambers 28 and 30. Close the top and clasp fasten the clasp and brush the animal freely. As the brush is moved transversely (i.e., perpendicular to the longitudinal axis of the brush) the cog wheel turns the cylinder. While the cylinder 40 is turning, powder collects in the plurality of circular depressions 44 in the head and thereafter deposits the powder as the cylinder rotates outside the body of the head to be exposed to the hair or fur of the animal. The snug fit of the cylinder 40 in the elongate opening 38 prevents powder from escaping from the chambers 28 and 30 by means other than the exposed shallow depressions 44. Since powder is being dispensed during grooming, the powder is simultaneously worked onto the skin of the animal.

The brush may be manufactured of any of a number of suitable materials, but in its preferred embodiment it is composed of molded plastic.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A powder-dispensing animal grooming brush, comprising:
    a handle adapted for holding by the human hand and generally defining the proximal end of said brush;
    an elongate hollow head integrally connected to said handle, generally defining the distal end of said brush, and having a proximal and distal chamber;
    a bottom side having an elongate opening with its length substantially parallel to the longitudinal axis of said brush;
    a top side;
    a first partition dividing said head into said proximal chamber such that said proximal chamber extends from one end of said handle to the approximate middle of said head;
    a second partition parallel to said first partition and defining a narrow space between said first partition and said second partition, further defining said distal chamber of said head, and extending through said bottom side of said head;
    a plurality of bristles projecting downward from said bottom side of said head;
    an elongate cylinder having a plurality of shallow depressions along its length on the outside surface, rotatingly affixed to said head and snugly fit into said elongate opening in said bottom side of said head;
    pivot means by which said elongate cylinder is rotatingly connected to said head;
    fur engaging means for engaging the hair or fur of an animal during transverse brushing thereby causing said elongate cylinder to rotate;
    sealing means operatively associated with said elongate cylinder and said elongate opening to prevent powder from being discharged from the interior of said head when said elongate cylinder is not rotating;
    a living hinge running continuously along the length of any one side of said head and connecting said top to said head such that said top may be open to expose said proximal and distal chambers thus allowing said chambers to be filled with powder; and
    connection means for latching said top to said head when closed.

2. The powder-dispensing animal grooming brush of claim 1 wherein said fur engaging means comprises a cog wheel, having a plurality of teeth at its circumference, connected to said cylinder and having a sufficient radius that it engages the fur or hair of an animal during grooming, and being positioned in the narrow space defined by said first and second partitions.

3. The powder-dispensing animal grooming brush of claim 1 wherein said connection means comprises a first thin tab of material integrally formed with said top and a second thin tab of material integrally formed with a side of said head such that when said top is snapped onto said head said first and second tabs interaffliate with pressure.

4. A powder-dispensing animal grooming brush, comprising:
    an elongate hollow head, comprising:
        a bottom side bisected longitudinally by an elongate opening;
        a first side;
        a second side;
        a third side; and
        a fourth side;

a handle integrally connected to said fourth side and adapted for holding by the human hand;

a first partition substantially dividing said head at the approximate middle in a line perpendicular to the longitudinal axis of the head;

a second partition parallel to said first partition and defining a narrow space between said first partition and said second partition;

a first chamber defined by said first partition, said first side, said second side, and said fourth side;

a second chamber defined by said second partition, said first side, said second side, and said third side;

a plurality of bristles projecting downward from said bottom side of said head;

a cylinder having integrally formed caps at each end, and having a plurality of shallow circular depressions forming several rows along its length, rotatingly affixed to said first and third sides, and snugly fit into the elongate opening in said bottom side of said head so as to prevent powder from being discharged from the interior of said head by means other than by rotation of said cylinder;

a first pivot means connected to said third side to which one end of said cylinder is rotatingly connected;

a second pivot means connected to said fourth side to which one end of said cylinder is rotatingly connected;

a cog wheel, having a plurality of scalloped teeth at its circumference, connected to said cylinder at the horizontal axis, such that said cylinder functions as a hub for said cog wheel, and having a radius such that the tips of said scalloped teeth extend approximately to the tip of said bristles for engagement with the fur or hair of an animal during grooming, and positioned in the narrow space defined by said first and second partitions;

a living hinge running continuously along the length of said second side of said head;

a top connected to said second side of said head by said living hinge; and latching means for securing said top to said first side of said head when closed.

5. The powder-dispensing animal grooming brush of claim 4 wherein said latching means comprises a first thin tab integrally formed with said top and a second thin tab integrally formed with a side of said head such that said first and second tabs interaffliate with pressure when the top is closed.

* * * * *